United States Patent [19]
Faulkner

[11] Patent Number: 5,214,874
[45] Date of Patent: Jun. 1, 1993

[54] HOLDER FOR FISHING ROD OR THE LIKE

[76] Inventor: Robert L. Faulkner, P.O. Box 63, Dorset, Vt. 05251

[21] Appl. No.: 845,148

[22] Filed: Mar. 3, 1992

[51] Int. Cl.$^5$ .................... A01K 97/00; A01K 87/00
[52] U.S. Cl. .................... 43/25.2; 43/54.1; 43/57.1; 24/16 PB; 24/306; 24/442; 128/DIG. 15
[58] Field of Search .............. 43/25.2, 54.1, 57.1, 43/25; 128/DIG. 15; 24/306, 442, 16 R, 16 PB

[56] References Cited

U.S. PATENT DOCUMENTS

| | | | |
|---|---|---|---|
| 3,383,738 | 5/1968 | Fox | 24/306 |
| 3,543,977 | 12/1970 | Lockridge | 128/DIG. 15 |
| 3,947,927 | 4/1976 | Rosenthal | 24/16 R |
| 3,994,048 | 11/1976 | Rosenthal | 24/306 |
| 4,149,540 | 4/1979 | Hasslinger | 128/DIG. 15 |
| 4,414,969 | 11/1983 | Heyman | 128/DIG. 15 |
| 4,457,095 | 7/1984 | Stevenson | 43/25.2 |
| 4,671,787 | 6/1987 | Widman | 128/DIG. 15 |
| 4,759,963 | 7/1988 | Uso | 43/54.1 |
| 4,780,983 | 11/1988 | Smith | 43/57.1 |
| 4,862,563 | 9/1989 | Flynn | 24/442 |
| 4,864,698 | 9/1989 | Brame | 24/16 PB |
| 4,893,381 | 1/1990 | Frankel | 24/442 |
| 4,942,690 | 7/1990 | Lund | 43/43.12 |
| 4,963,410 | 10/1990 | Bryant | 24/306 |
| 5,020,264 | 6/1991 | Demski . | |
| 5,076,288 | 12/1991 | Millard | 128/DIG. 15 |
| 5,086,543 | 2/1992 | Mitchell | 24/16 PB |
| 5,104,076 | 4/1992 | Goodall | 24/306 |

*Primary Examiner*—Kurt C. Rowan
*Attorney, Agent, or Firm*—Bacon & Thomas

[57] ABSTRACT

A holder for temporarily fastening an article to a fishing rod or the like including a plurality of strap-like pliable members which are fastened together by one or more elastic elements. The holders are adapted to be wrapped around the foregrip of a fishing rod and held in place by a plurality of hooks and loops. A second strap-like member or talon and elastic element are adapted to releasably hold the article in place.

8 Claims, 2 Drawing Sheets

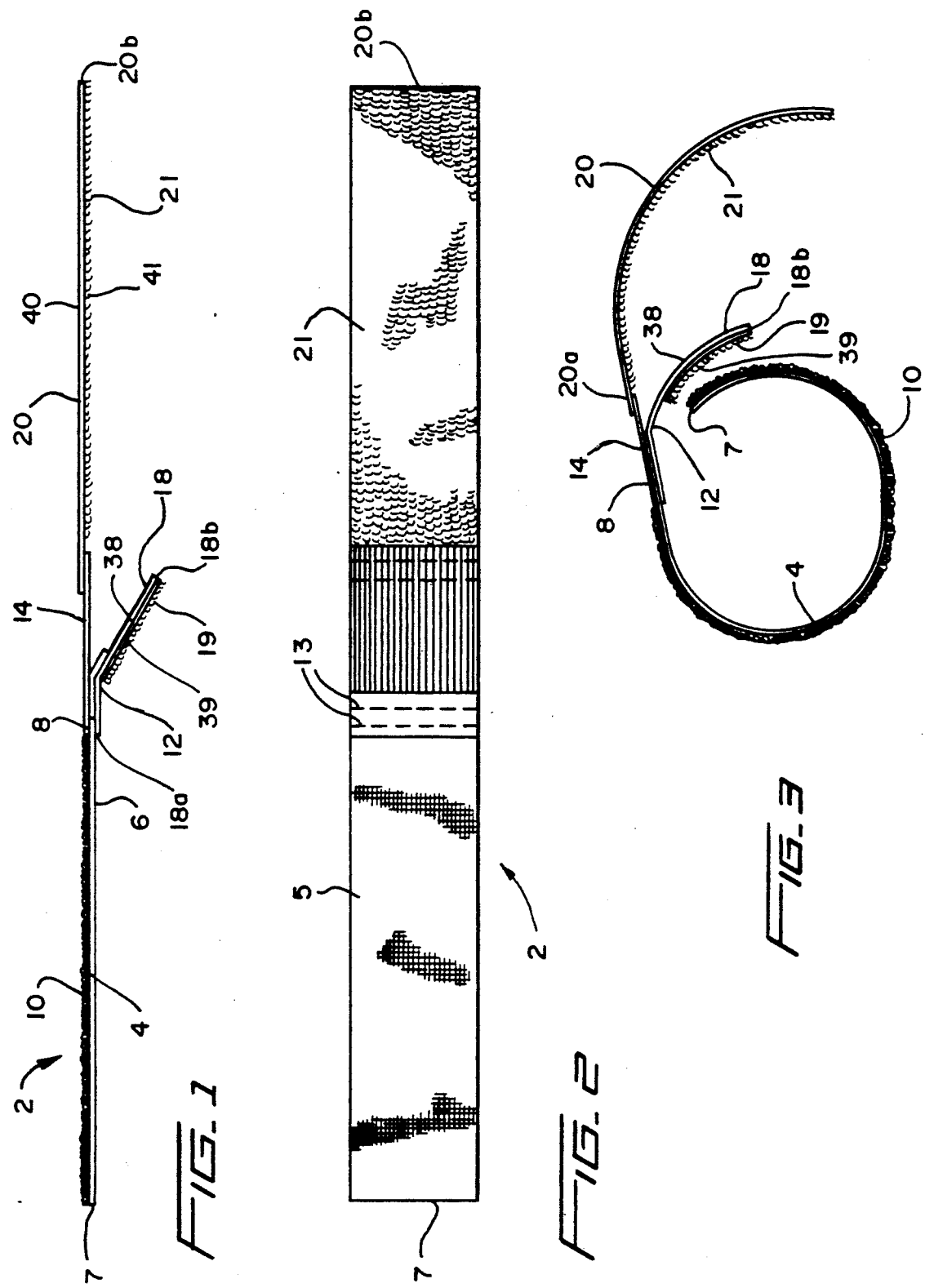

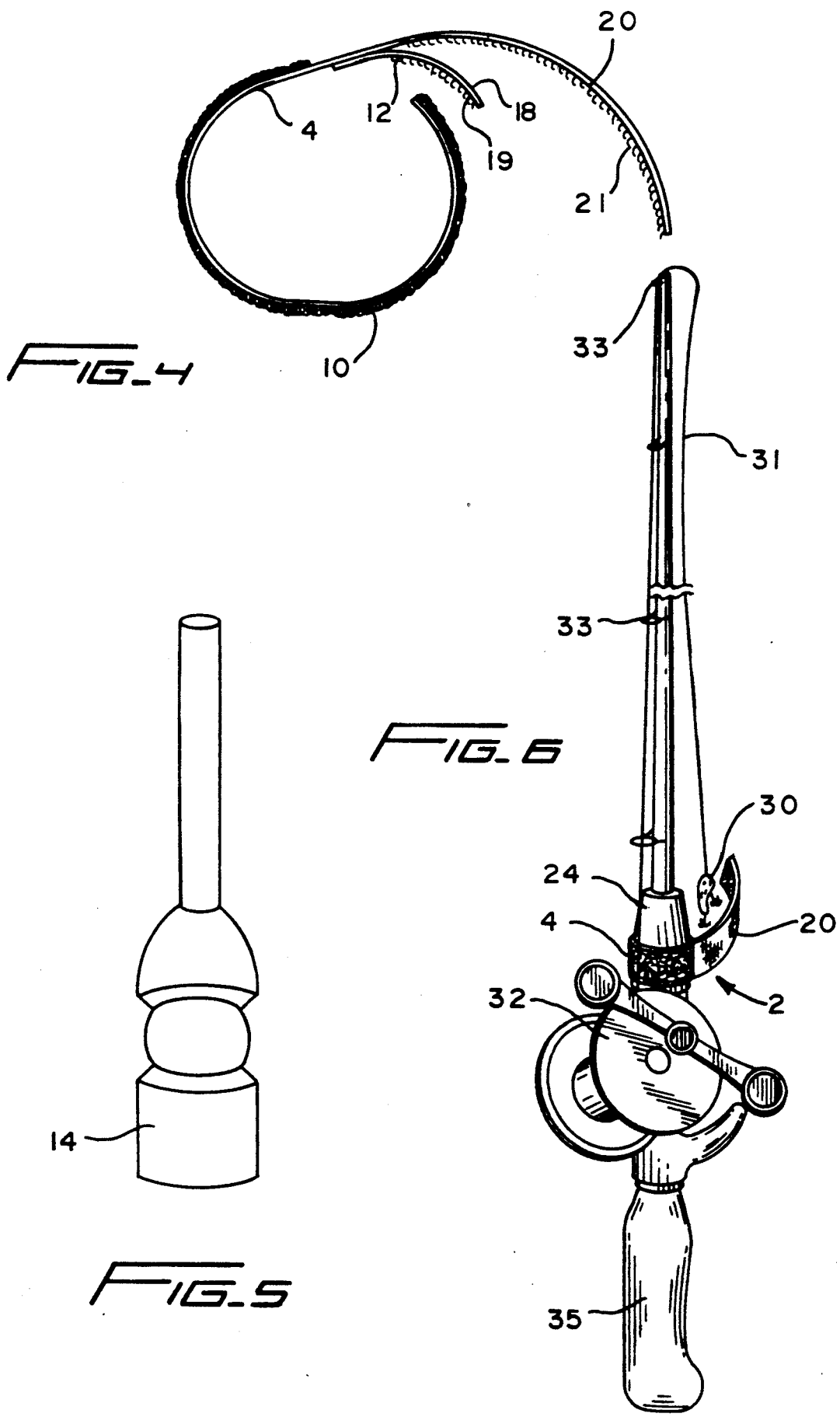

HOLDER FOR FISHING ROD OR THE LIKE

The present invention relates to a holder for a fishing rod or the like and, more particularly, to a holder having a plurality of flexible strap-like elements for temporarily fastening an article to a rod-like element.

BACKGROUND OF THE INVENTION

It is presently believed that the holders, according to the present invention, will have broad applications in the fastener field and perhaps beyond that field. For example, there are problems in storing tent poles, pipe, sailing masts and booms, etc., that may be overcome by the holder disclosed herein. Nevertheless, the novel holders disclosed herein are known to offer a number of advantages which are peculiar to fishing rods. Accordingly, the initial development efforts have been directed to that field and the description of the preferred embodiments of the invention will emphasize fishing without in any way limiting the broader aspects of the invention. Other applications will be readily apparent to those who are skilled in the art of fasteners, holders and ties.

Sport and leisure fisherman frequently carry a number of rods which are equipped with reels, line and various lures or baited hooks. One problem associated with carrying more than one rod is that the lines become easily tangled and the lures and hooks are dangerous. This problem is easily exacerbated in the case of tournament fishermen who may carry eight to twelve or more fully-equipped and baited rods during a tournament. In tournaments, time is of the essence and the tournament fisherman wants each rod to be almost instantly available.

There have been a number of approaches to overcome the aforementioned problem. For example, U.S. Pat. No. 5,020,264 to Demski discloses a holder for a fishing hook, line, leader or sinker. The Demski device comprises a pliable holder having a plurality of hook fasteners at one end and a plurality of loop fasteners at the other end. The pliable holder also includes a slot for accommodating a fishing line guide. When placed about a fishing rod in its holding position with a line guide fitted through the slot, the holder's axial movement along the fishing rod is maintained.

However, it now appears that there may be a demand for an improved holder which is more convenient to use and which would be more suitable for tournament fishing or for the serious sport fisherman. It appears that there may be a market for an improved holder which can be readily, securely and removably attached to the foregrip of a fishing rod which may or may not, at the fisherman's option, remain attached to the rod during fishing. The improved holder would securely retain a lure or baited hook in the foregrip area until released by the fisherman. In addition, it is presently believed that there may be a large commercial market for an improved holder which can be manufactured at a nominal cost, is desirable, easy to use, secure and which has a pleasing and professional appearance.

It has now been found that a holder in accordance with the present invention provides the aforementioned features.

BRIEF SUMMARY OF THE INVENTION

In essence, the present invention contemplates a holder for temporarily fastening an article, such as a fishing lure or hook, to a rod-like element such as the foregrip of a fishing rod. The holder includes a first elongated flexible strap-like body member which has a generally elongated rectangular shape with top and bottom surfaces and distal and proximal ends. First fastening means such as a plurality of hooks or loops of the type commonly identified with Velcro ® fasteners are fixed to and cover a significant portion of the bottom surface. The fastening means preferably cover essentially the entire bottom surface and at least an area which is adjacent to the proximal end. A pair of elastic strap-like extension elements are attached or stitched to the distal end of the first strap-like body member to form a y-like or forked structure with one of the elastic members on top of the other and with the elastic elements coaxially aligned with the longitudinal axis of the first elongated flexible strap-like body member. A second and a third elongated flexible strap-like member which also have generally elongated rectangular shapes with top and bottom surfaces and distal and proximal ends are each attached or stitched to a separate one of the elastic extension elements at an opposite end thereof to thereby form a coaxial extension at the first elongated flexible strap-like body member. Complementary fastening means such as a plurality of hooks or loops are attached to and preferably cover a significant portion of one surface of the second and third elongated flexible strap-like members. In a preferred embodiment of the invention, a mass of fabric-like loops cover the bottom surface of the first elongated flexible strap-like body member and a mass of hooks cover at least a major portion of the upper surfaces of the axially aligned second and third elongated flexible strap-like members. Thus, it can be seen that the first and second elongated flexible strap-like members and one of the elastic extension elements form a stretchable strap which has an elongated rectangular shape and which is adapted to be wrapped smugly around a rod and held in place thereon by means of the stretched elastic element and by the interengagement of the fastening means and complementary fastening means, i.e., the hooks and loops of the preferred embodiment. The third elongated flexible strap-like member which is preferably considerably longer than the second elongated flexible strap-like member and the second elastic element are then adapted to wrap around an article such as a fishing lure and hold it snugly in place by means of the stretch in the elastic element and by means of the complementary fastening means engagement with the fastening means on the first elongated body member. The lure can then be readily released by pulling the fastening and complementary fastening means apart. And then the holder is immediately ready to reattach the article to the rod.

The invention also contemplates the combination of a fishing rod and a holder for temporarily fastening a fishing line to the foregrip of the rod. The combination includes a handgrip, a reel supporting portion forward of the hand grip and a foregrip on the opposite side of the reel supporting portion from the hand grip. The combination also includes a reel having a length of fishing line stored thereon and attached to the reel supporting portion. A flexible rod extends outwardly from the opposite side of the foregrip, i.e., the side farthest from the reel, and includes a plurality of guides with one of the guides disposed at the tip of the rod. The fishing line extends along the rod, through the guides and beyond the tip of the rod. A lure is attached to the end of the line and, when not in use, may be held in a ready position, i.e., to the foregrip by a holder as described above.

The invention will now be described in connection with the accompanying drawings wherein like reference numerals have been used to designate like parts.

DESCRIPTION OF THE DRAWINGS

FIG. 1 is a bottom or plan view of a holder according to a first embodiment of the invention wherein the holder is in a generally flat position for shipping or storage;

FIG. 2 is a side-elevational view of the holder shown in FIG. 1 but with one portion folded outwardly for illustrative purposes;

FIG. 3 is a side-elevational view of the holder shown in FIGS. 1 and 2 but illustrating the general form of the holder as it approaches a holding position;

FIG. 4 is a side-elevational view of a holder according to a second embodiment of the invention which illustrates the general form of the holder as it approaches a holding position;

FIG. 5 is a side-elevational view of a foregrip of a fishing rod which has an indentation for receiving a holder in accordance with the present invention; and FIG. 6 is a side-elevational view of a fishing rod and holder in accordance with the present invention.

DETAILED DESCRIPTION OF THE PREFERRED EMBODIMENTS OF THE INVENTION

As illustrated in FIGS. 1 through 3, a holder 2 for temporarily fastening an article such as a fishing lure to a fishing rod has a generally flat elongated strap-like structure. The holder 2 comprises a first elongated flexible strap-like member 4 which may, for example, be about 3 to 5 inches in length, about 4 inches for a common size rod, and about ¾ to 1½ inches wide, preferably about 1 inch, and has a nominal thickness of perhaps less than 1/16 inch. The body member 2 is preferably made of a weather-proof fabric such as polyester, nylon or plastic as are other strap-like elements which will be described hereinafter.

As shown in FIGS. 1 through 3, the strap-like body member 4 has top and bottom surfaces 5 and 6 and proximal and distal ends 7 and 8. First, fastening means 10, such as a plurality of relatively small cloth-like loops of the type commonly used in Velcro ® fasteners cover the top surface 5 and are fixed thereto in a customary manner such as, for example, by an adhesive or cement. The fastening means 10, i.e., cloth-like loops, cover a significant portion of the top surface 5 at least in the area adjacent to the proximal end 7. In a preferred embodiment of the invention, the entire surface 5 is covered with the cloth-like loops as illustrated.

A pair of strap-like elastic extension elements 12 and 14 are adhesively attached or stitched to the distal end 8 of body member 4 is superimposed relationship to one another by two rows of stitches 13 which run perpendicular to the longitudinal axis of body member 4. If adhesively attached, a thermoplastic, thermosetting, elastomer or other suitable adhesive may be used. As shown more clearly in FIGS. 2 and 3, the body member 4 and elastic extension members 12 and 14 form a y-like or forked structure wherein the elastic elements are coaxially aligned with the longitudinal axis of the body member 4.

Second and third elongated flexible strap-like members 18 and 20 are coaxially aligned with body member 4 and stitched or otherwise secured to the elastic extension elements 12 and 14, respectively. The members 18 and 20 are preferably of the same material as body member 4 and include first and second surfaces 38, 39 and 40, 41, respectively. The members 18 and 20 also include proximal ends 18a, 20a and distal ends 18b and 20b, respectively. The member 20 or talon is generally significantly longer than the member 18 and like body member 4 has a length which is preferably at least about three times its width. By contrast, the member 18 may have a length which is about equal to its width.

The near end of member 20 is stitched to the far side of the elastic element 14, i.e., at the opposite side from the one which is attached to body member 4 so that the body member 4, elastic element 14 and member 20 form an elongated flexible and stretchable strap which is adapted to be arranged around the foregrip of a fishing rod as illustrated in FIGS. 3 and 6.

Each of the members 18 and 20 include a plurality of fasteners such as hooks 19 and 21 disposed on their lower surfaces. The hooks 19 and 21 are the type which are commonly associated with Velcro ® fasteners.

In attaching the holder 2 to the foregrip 24 of a fishing rod 25 as shown in FIGS. 3 and 6, the body member 4, elastic element 12 and strap-like member 18 are wrapped tightly around the foregrip 24 and held in place thereon by the stretch or elastic force of elastic element 12 and by the hooks and loops on member 18 and body 4. In this manner, the elastic member 14 and talon 20 remain in an open position and do not interfere with the use of the rod for fishing. The talon 20 can be fixed to body member 4 during fishing, if desired.

In attaching a lure 30 to the foregrip 24 of the rod, sufficient line 31 is released from reel 32 and the lure 30 is placed between the talon 20 and a portion of body member 4 and the talon 20 is pulled over the lure 30 and its end portion pressed against body member 4 so that the hooks and loops attached thereto will hold the lure smugly in place. In this manner, the line 31 is held taut and constrained by guide members 33, reel 32 and holder 2.

In a preferred embodiment of the invention, the foregrip 24 includes an indented portion forward of the reel supporting portion for facilitating the attachment of holder 4 to the foregrip. This indented foregrip prevents any longitudinal movement of holder 4 if, for example, holder 4 is only loosely attached thereto.

A further embodiment of the invention is illustrated in FIG. 1V and includes a single elastic extension 12, flexible strap-like member 18 and talon 20. In this embodiment, the talon 20 may be a continuation of body member 4. Thus, the body member 4, elastic element 12 and strap-like member 18 holds the holder 4 securely to a fishing rod, while the lure is attached thereto by talon 20 without the benefit of a separate elastic extension. This approach, while less satisfactory than that of the preferred embodiment, is less expensive to produce and may appeal to some fisherman such as those engaging in leisure fishing.

It should also be recognized that in the case of fly fishing, the rods are normally segmented and that the segments can be readily fastened together by means of one or more holders in accordance with the present invention. For example, a first holder 2 may be fastened to the foregrip 24 of the rod and a second holder 2 fixed to the handle 35 in order to securely fasten the segments thereto.

While the invention has been described in connection with one of its preferred embodiments, it should be understood that changes and modifications may be made without departing from the scope of the appended claims.

What is claimed is:

1. A holder for temporarily fastening an article to a rod-like element comprising a first elongated flexible strap-like body member having first and second surfaces and distal and proximal ends, first fastening means fixed to and covering essentially the entire first surface, a pair of elastic strap-like extension elements with each of said elastic extension elements attached at one end thereof to said distal end of said first elongated flexible strap-like body member to thereby form a generally y-like or forked structure, a second and a third elongated flexible strap-like member having first and second surfaces and distal and proximal ends, said second elongated flexible strap-like member having a length which is shorter than the individual lengths of said first and said third strap-like members and said proximal ends of said second and third elongated flexible strap-like members each attached to a separate one of said elastic extension elements at an opposite end thereof and complementary fastening means fixed to one of said surfaces of each of said second and third elongated flexible strap-like members and covering a significant portion thereof near their distal ends whereby said first and second elongated flexible strap-like members and one of said pair of elastic extension elements form a stretchable strap which is wrapped around a rod and held in place thereon by said fastening means and complementary fastening means and whereby said third elongated flexible strap-like member and the other of said pair of elastic extension elements form a stretchable strap which is wrapped around the article and holds the article to the rod by means of the complementary fastening means on said third elongated flexible member and the fastening means on said first elongated flexible strap-like member and in which the complementary fastening means is fixed to the opposite surface of said second and third elongated flexible strap-like members from said first surface of said first elongated flexible strap-like body member and in which the fastening means and complementary fastening means comprise a plurality of hooks and loops.

2. A holder for temporarily fastening an article to a rod-like element according to claim 1 in which said elongated flexible strap-like members are made of a waterproof material.

3. A holder for temporarily fastening a fishing lure or hook to the foregrip of a fishing rod comprising a first elongated flexible strap-like body member having a length which is at least about three times its width, first and second surfaces and distal and proximal ends, first fastening means fixed to and covering essentially the entire first surface, a pair of elastic strap-like extension elements with each of said elastic extension elements attached at one end thereof to said distal end of said first elongated flexible strap-like body member to thereby form a generally y-like structure, a second and a third elongated flexible strap-like members having first and second surfaces and distal and proximal ends, said second elongated flexible strap-like member having a length which is shorter than the individual lengths of said first and said third strap-like members and said proximal ends of said second and third elongated flexible strap-like members, each attached to a separate one of said elastic extension elements at an opposite end thereof and complementary fastening means fixed to one of said surfaces of each of said second and third elongated flexible strap-like members and covering a significant portion thereof near their distal ends and on the opposite surface with respect to the first surface of said first elongated flexible strap-like body member, said first and said second elongated strap-like members and one of said pair of elastic extension elements forming a continuous stretchable strap which wrapped around the foregrip of a fishing rod and held in place thereon by said fastening means and complementary fastening means and said third elongated flexible strap-like member and the other of said pair of elastic extension elements form a stretchable strap which is wrapped around a fishing lure and holds the lure to the foregrip of the rod by the complementary fastening means on said third elongated flexible member and the fastening means on said first elongated flexible strap-like body member and in which the fastening means and complementary fastening means comprises a plurality of hooks and loops.

4. A holder for temporarily fastening a fishing lure or hook to the foregrip of a fishing rod according to claim 3 in which said elongated flexible strap like members are made of a waterproof material.

5. A holder for temporarily fastening a fishing lure or hook to the foregrip of a fishing rod according to claim 4 in which the width and thickness of said first, second and third elongated flexible strap-like members are essentially equal and in which the lengths of said first and third elongated strap-like members are bout equal and at least about 2½ times the length of said second elongated strap like member.

6. A holder for temporarily fastening a fishing lure or hook to the foregrip of a fishing rod according to claim 4 in which the first, second and third elongated strap-like members are made of a polyester material and are between about ¾ and 1¼ inches wide.

7. The combination of a fishing rod and a holder for temporarily fastening a fishing lure to the foregrip of the fishing rod comprising a hand grip, a reel supporting portion forwardly of said hand grip and as foregrip forwardly of said reel supporting portion, a reel having a length of a fishing line stored thereon mounted on said reel supporting portion and a flexible rod extending outwardly from said foregrip, said rod including a plurality of guide members with one of said guide members fixed to the outward tip of said rod, said fishing line extending along said rod and through said guide members and a fishing lure attached to said line beyond said tip-mounted member, a first elongated flexible strap-like body member having a length which is at least about three times its width, first and second surfaces and distal and proximal ends, first fastening means fixed to and covering essentially the entire first surface, a pair of elastic strap-like extension elements with each of said elastic extension elements attached at one end thereof to said distal end of said first elongated flexible strap-like body member to thereby form a generally y-like structure, a second and a third elongated flexible strap-like members each attached to a separate one of said elastic extension elements at an opposite end thereof and complementary fastening means fixed to one of said surfaces of each of said second and third elongated flexible strap-like members and covering a significant portion thereof near their distal ends and on the opposite surface with respect to the first surface of said first elongated flexible strap-like body member, said second elongated flexible strap-like member having a length which is shorter than the individual lengths of said first and said third strap-like member, said first and said second elongated strap-like members and one of said pair of elastic extension elements forming a continuous stretchable strap which is wrapped around the foregrip of a fishing rod and held in place thereon by said fastening means and complementary fastening means and said third elongated flexible strap-like member and the other of said pair of elastic extension elements forming a stretchable strap which is wrapped around a fishing lure to hold the lure to the foregrip of the rod by the complementary fastening means on said third elongated flexible member and the fastening means on said first elongated flexible strap-like body member.

8. The combination of a fishing rod and a holder for temporarily fastening a fishing lure to the foregrip of the fishing rod according to claim 7 in which said foregrip includes a recessed portion having a width that is at least slightly wider than the width of said first elongated strap-like body member and which is adapted to have said first and said second elongated strap-like members wrapped therearound and fixed thereto by means of the stretching of the first of said elastic extension elements and by said fastening means and said complementary fastening means.

* * * * *